United States Patent
Li et al.

(10) Patent No.: US 8,183,501 B2
(45) Date of Patent: May 22, 2012

(54) METHOD FOR CONTROLLING GLOW PLUG IGNITION IN A PREHEATER OF A HYDROCARBON REFORMER

(75) Inventors: Bob X. Li, Grand Blanc, MI (US); Brian K. Allston, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 1194 days.

(21) Appl. No.: 12/001,798

(22) Filed: Dec. 13, 2007

(65) Prior Publication Data

US 2009/0151338 A1    Jun. 18, 2009

(51) Int. Cl.
*F23Q 7/00* (2006.01)

(52) U.S. Cl. ........................................ 219/260
(58) Field of Classification Search .................. 219/260, 219/261–270
See application file for complete search history.

(56) References Cited

U.S. PATENT DOCUMENTS

| | | | |
|---|---|---|---|
| 6,335,516 B1 | 1/2002 | Muller | 219/270 |
| 6,803,544 B1 * | 10/2004 | Zikes et al. | 219/263 |
| 6,878,903 B2 * | 4/2005 | Duba | 219/270 |
| 7,160,584 B2 | 1/2007 | Goeb | 427/454 |
| 7,469,840 B2 * | 12/2008 | Donnelly et al. | 236/20 R |
| 7,538,297 B2 * | 5/2009 | Anderson et al. | 219/260 |
| 2003/0226837 A1 * | 12/2003 | Blake et al. | 219/260 |
| 2004/0206742 A1 * | 10/2004 | Duba | 219/270 |

* cited by examiner

*Primary Examiner* — Daniel L Robinson

(74) *Attorney, Agent, or Firm* — Thomas N. Twomey

(57) ABSTRACT

A method for controlling a glow plug at a desired temperature. In a glow plug off state, the glow plug temperature status is monitored to prepare for the next combustion event. When ignition is requested, a determination is made as to how long full voltage can be applied to bring the glow plug to ignition temperature. A resistance/temperature map is provided to determine the resistance as a function of temperature. Another map is provided of temperature as a function of powering time at a full battery voltage in a First Heating Phase to ensure that the surface temperature of the glow plug will reach a predetermined temperature required to start combustion of an air/fuel mixture. A third map is provided of a PWM duty cycle for a Second Heating Phase to maintain the temperature of the glow plug to ensure flame propagation without damage to the glow plug.

6 Claims, 6 Drawing Sheets

METHOD FOR CONTROLLING GLOW PLUG IGNITION IN A PREHEATER OF A HYDROCARBON REFORMER

TECHNICAL FIELD

The present invention relates to hydrocarbon catalytic reformers; more particularly, to method and apparatus for preheating a reformer catalyst to shorten the start-up time; and most particularly, to control of an "instant" glow plug igniter in a hydrocarbon reformer for generating hydrogen in a diesel exhaust stream to regenerate an NOx trap and particulate filter.

BACKGROUND OF THE INVENTION

Diesel engines typically are provided with exhaust after-treatment devices to clean exhaust gases by trapping nitrogen oxides (NOx) and carbon particulates formed during engine combustion. Traps for these contaminants, however, become sated with engine use and must be regenerated periodically.

It is known to employ a hydrocarbon reformer in communication with the diesel exhaust stream to generate hydrogen on command by catalytic partial reduction of diesel fuel. Hydrogen is an excellent reductant for regeneration of NOx and particulate traps.

Hydrogen-containing reformate is produced by injecting diesel fuel and air into a mixing chamber in the reformer ahead of the catalyst. Typically, such mixture at start-up is substantially leaner in fuel than the mixture used for reforming after the catalyst reaches operating temperature. The initial mixture in the mixing chamber is ignited to start combustion, providing a hot exhaust that rapidly warms the catalyst, after which combustion is terminated: the flame is quenched, and the mixture is switched to a rich condition for reforming.

During the reforming process, the igniter remains off, waiting within the mixing chamber for use in the next combusting ignition cycle. In the prior art, a spark plug is used to ignite the mixture. While not in sparking mode, during reforming mode the spark plug points can become progressively fouled with carbon deposits on the plug tip and ceramic sleeve, forming an electric short and inhibiting or outright preventing sparking when subsequently needed.

Various solutions have been proposed to counter such carbon buildup, for example, using a high energy ignition coil to generate a strong current to deliver intense heat in a short time and thus to burn off any carbon deposits prior to the start of sparking. This solution has not been operationally satisfactory and further it requires addition of a high energy coil and controls, thus increasing manufacturing cost and complexity.

Alternatively, it has been proposed to use a glow plug in place of the sparking plug; however, glow plugs generically are slow to heat and thus are not well suited to this application. Recently, several manufacturers have invented a very rapid heating diesel engine glow plug, such as a ceramic glow plug, that would permit use of a glow plug in the present diesel exhaust reformer application except that the rapid-start glow plug lacks the self-regulating characteristics of a convention glow plug and is easily damaged or destroyed by overheating without control. The new glow plugs have a heat-up time of only one to two seconds and require significantly less energy than conventional glow plugs. See, for example, BERU-assigned U.S. Pat. Nos. 6,335,516 and 7,160,584.

What is needed in the art is a combustion ignition control strategy and method that permits use of a rapid-start glow plug with a 12 volt source while preventing damage or destruction of the glow plug.

It is a principal object of the present invention to employ a rapid-start glow plug as a reformer igniter in a hydrocarbon reformer of a diesel engine emissions regeneration system.

SUMMARY OF THE INVENTION

Briefly described, a method in accordance with the invention employs an algorithm to control the heating cycle of a rapid-start glow plug. When the glow plug is in an off state, as during reforming, a control circuit monitors the glow plug temperature status to prepare for the next requested combustion event. When combustion ignition is requested, a determination is made, based on a resistance measurement of the glow plug, as to how long the voltage can be applied to the glow plug to quickly bring the glow plug to ignition temperature. A resistance vs. temperature map is provided to determine the temperature of the glow plug before applying power to the glow plug. Another map is provided of the glow plug initial temperature as a function of powering time at a full battery voltage in a First Heating Phase to ensure that the surface temperature of the glow plug will consistently reach, as rapidly as possible, a predetermined minimum temperature required to start combustion of the air/fuel mixture. A third map is provided of a PWM duty cycle for a Second Heating Phase as a function of the air/fuel flow rate to maintain the temperature of the glow plug at any selected flow condition to ensure flame propagation without damaging the glow plug through electrical overheating. A self regulated glow plug temperature control circuit regulates the power to the glow plug to bring the temperature of the glow plug to the ignition temperature rapidly and maintains that temperature in the ignition of the air fuel in the hydrogen reformer operation process.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
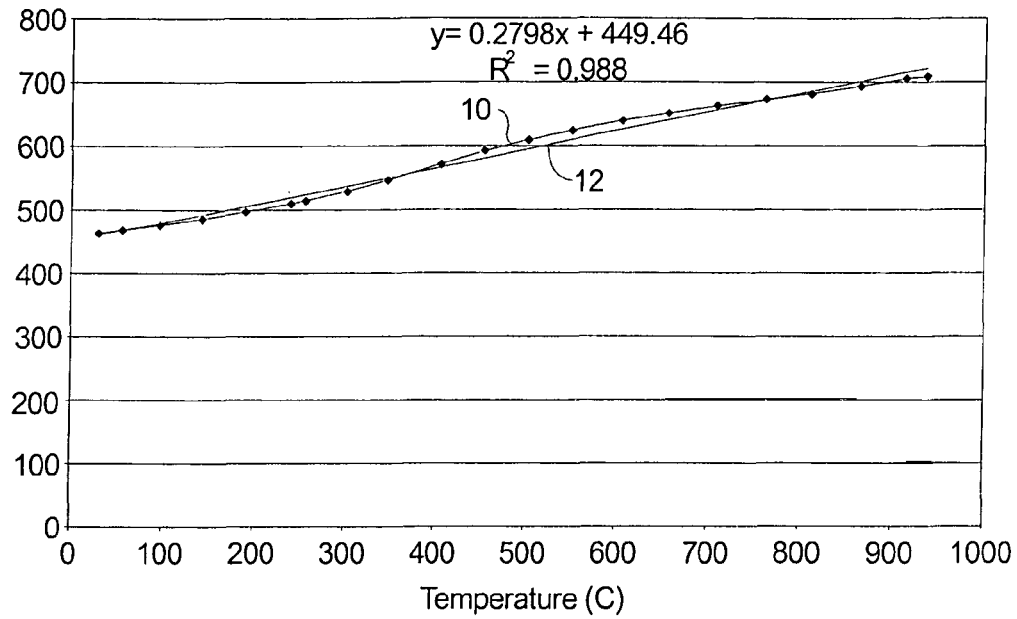
FIG. 1 is a graph showing glow plug resistance as a function of glow plug temperature for an exemplary rapid-start glow plug.

It is known in the glow plug art that glow plug resistance typically increases almost linearly with temperature over a wide temperature range. Referring to FIG. 1, resistance variation is shown for an exemplary rapid-start glow plug. Actual data are shown in curve 10, and curve 12 is a linear least squares fit of the data. The temperature dependence is important in a control scheme in accordance with the invention as input to calculations of allowable voltages, currents, temperatures, and duty cycles.

Figure 2:
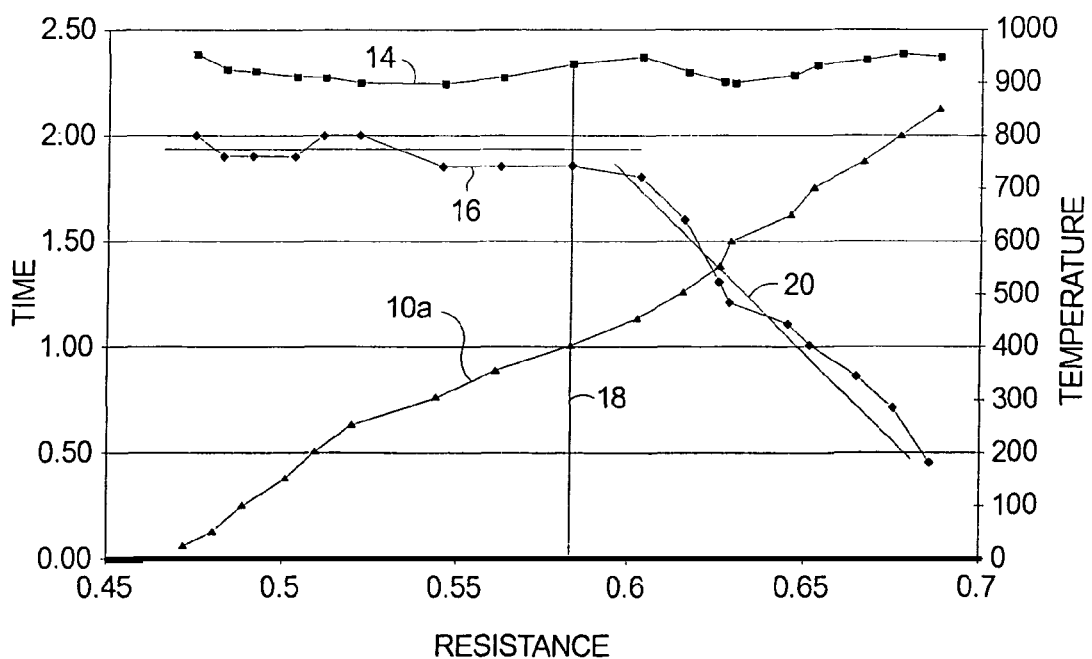
FIG. 2 is a set of graphs showing the length of time to which an exemplary glow plug may be subjected to high voltage during a Heating Phase 1 based on the initial glow plug temperature measurement in accordance with the invention.
Figure 3:
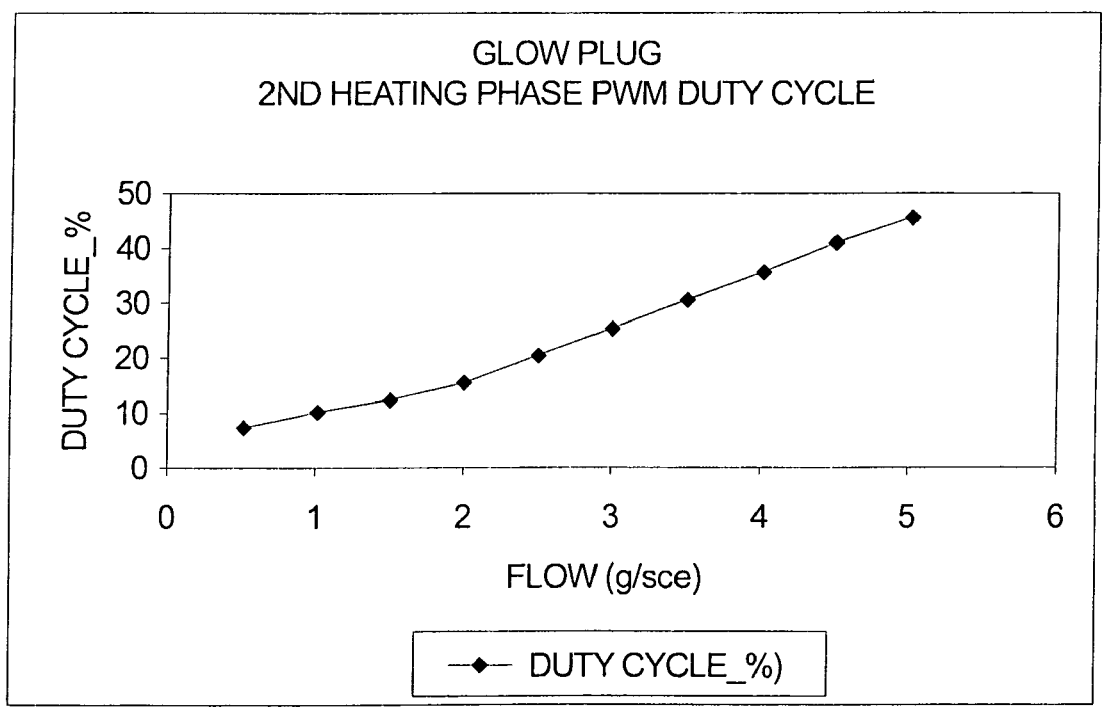
FIG. 3 is a graph showing duty cycle percentage as a function of air fuel flow rate for an exemplary glow plug during a Heating Phase 2 in accordance with the invention.
Figure 4:
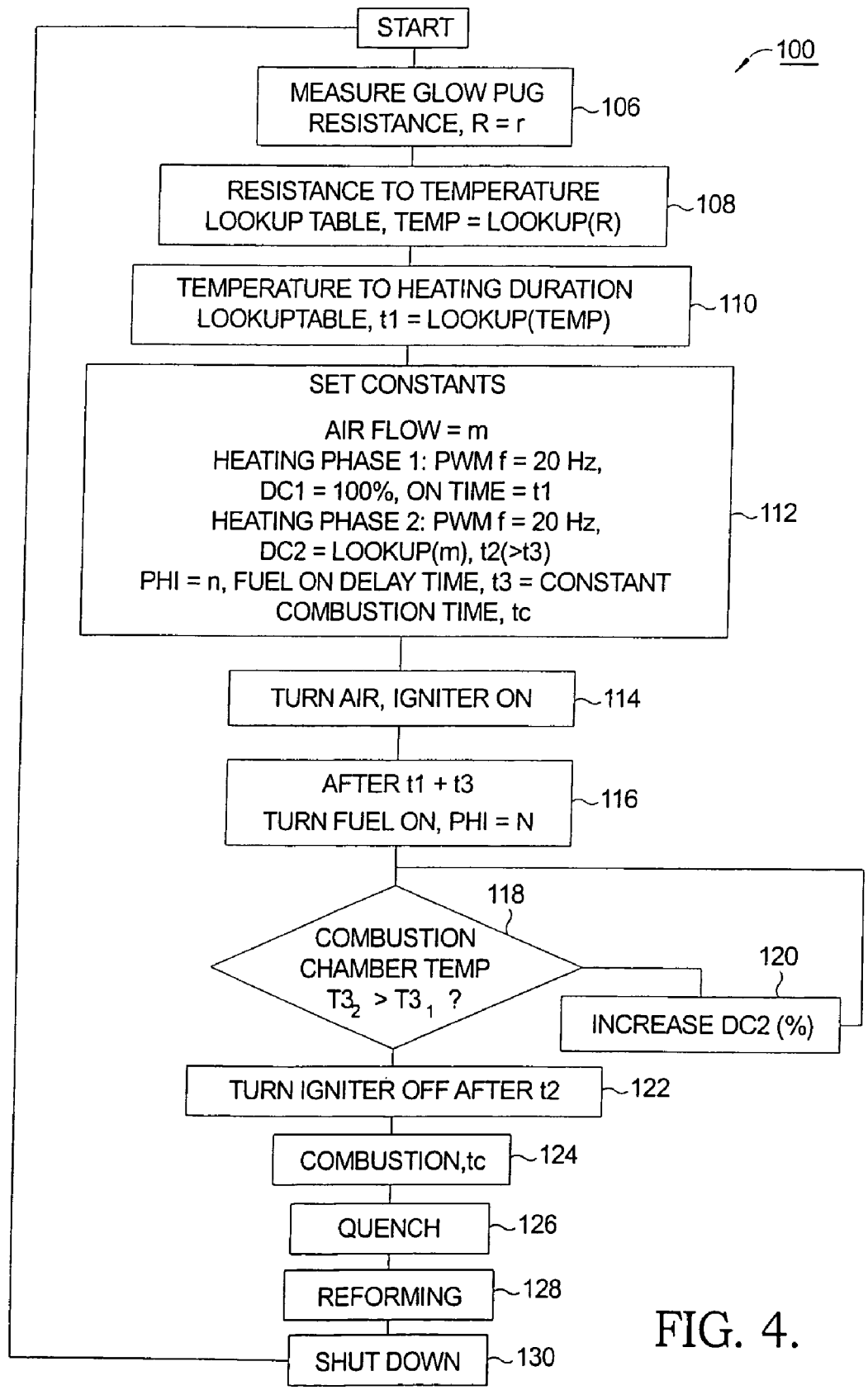
FIG. 4 is a first algorithm in accordance with the invention for controlling glow plug ignition of a fuel/air mixture at startup of a catalytic hydrocarbon reformer.
Figure 5:
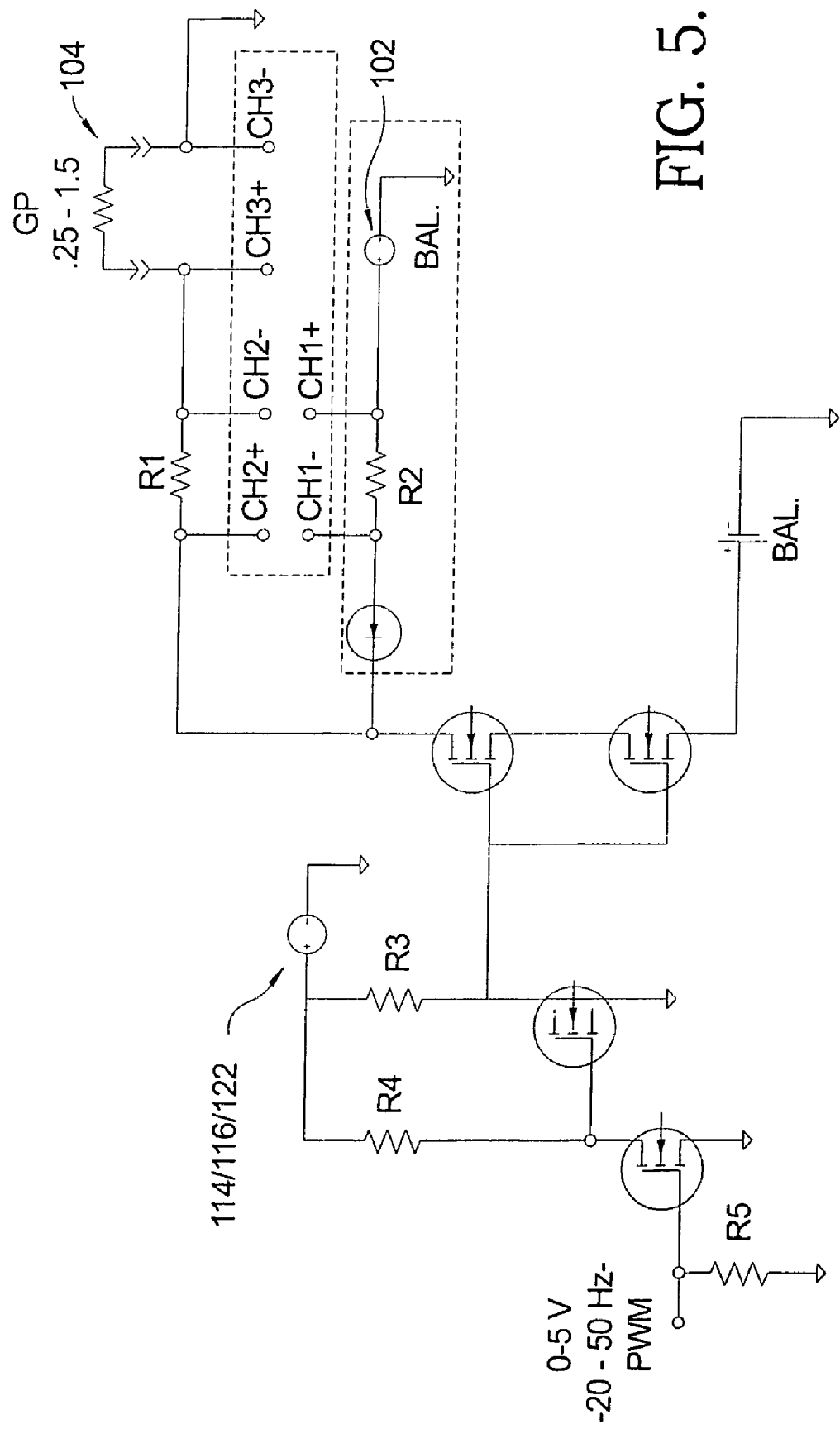
FIG. 5 is a circuit diagram for implementing the algorithm shown in FIG. 4.

Referring to FIG. 2, curve 10*a* is a replot of the temperature/resistance data in curve 10 shown in FIG. 1. Curve 14 shows the target glow plug surface temperature $T_C$ (right ordinate of the graph) required for ignition of an exemplary fuel/air mixture formed of diesel fuel. Curve 16 shows the time (left ordinate) to which a glow plug may be subjected safely to 100% duty cycle during Heating Phase 1 to reach $T_C$, as a function of the initial temperature of the glow plug. For example (see line 18), at glow plug starting temperatures of 450° C. or lower, a 100% duty cycle may be applied safely for up to about 2 seconds; however, at higher glow plug starting temperatures, the allowable time for full duty cycle drops off sharply (negative slope of average line 20), and exceeding this time limit can cause irreversible damage to the glow plug. Thus it is very important to know the temperature/resistance characteristics of the particular glow plug to be used.

As is well known in the art, computer lookup tables may be readily constructed from data obtained on actual engines and glow plugs or by calculation from modeling.

The present invention is especially useful for controlling rapid-start glow plugs such as metal or ceramic glow plugs available, for example, from BERU Aktiengesellschaft, Ludwigsburg, Germany.

Referring now to FIGS. 2 through 5, a first algorithm 100 for controlling temperature and heating time/intensity of a glow plug during start-up of a catalytic reformer is based upon the resistance of the glow plug.

A small voltage 102 is passed through glow plug 104 to determine 106 a glow plug resistance R. From resistance R, a glow plug temperature $T_1$ is inferred from curve 10 which is present as a lookup table 108 in a Reformer Control Module (not shown) for controlling reformer operation.

From the inferred value of $T_1$, a time t1 required to heat the glow plug surface from $T_1$ to $T_C$ is derived from a lookup table 110 corresponding to curves 10, 14, and 16.

The system constants are set 112: mass air flow m into the reformer; First Heating Phase PWM duty cycle 1=100%; Second Heating Phase PWM duty cycle 2 calculated from a look-up table including the data shown in FIG. 3 and conducted for time t2 to maintain the glow plug at ignition temperature; fuel/air mixture phi=n; fuel delay time t3 is set to allow for heating the glow plug to $T_C$ before fuel introduction; and a total combustion time tc is set for mixture combustion in the reformer mixing chamber for heating up the substrate to the desired temperature.

Air flow m to the reformer is started and the igniter (glow plug) is turned on 114 (start of t1).

After passage of times t1 and t3, fuel to the reformer is started 116 at phi=n, beginning Heating Phase 2 (start of time t2) at PWM duty cycle 2.

Successful combustion start is checked by checking for temperature rise 118 in the combustion chamber and increasing 120 duty cycle 2 if combustion has not started.

After time t2, the glow plug is turned off 122. Combustion continues 124 through time tc, then flame is quenched 126 by air, the fuel flow rate is adjusted to provide a new value of fuel/air mixture phi, and reforming 128 proceeds for a predetermined length of time required for regeneration of the diesel aftertreatment devices. The reformer is then shut down 130 and the system is readied for the next reforming cycle.

Figure 6:
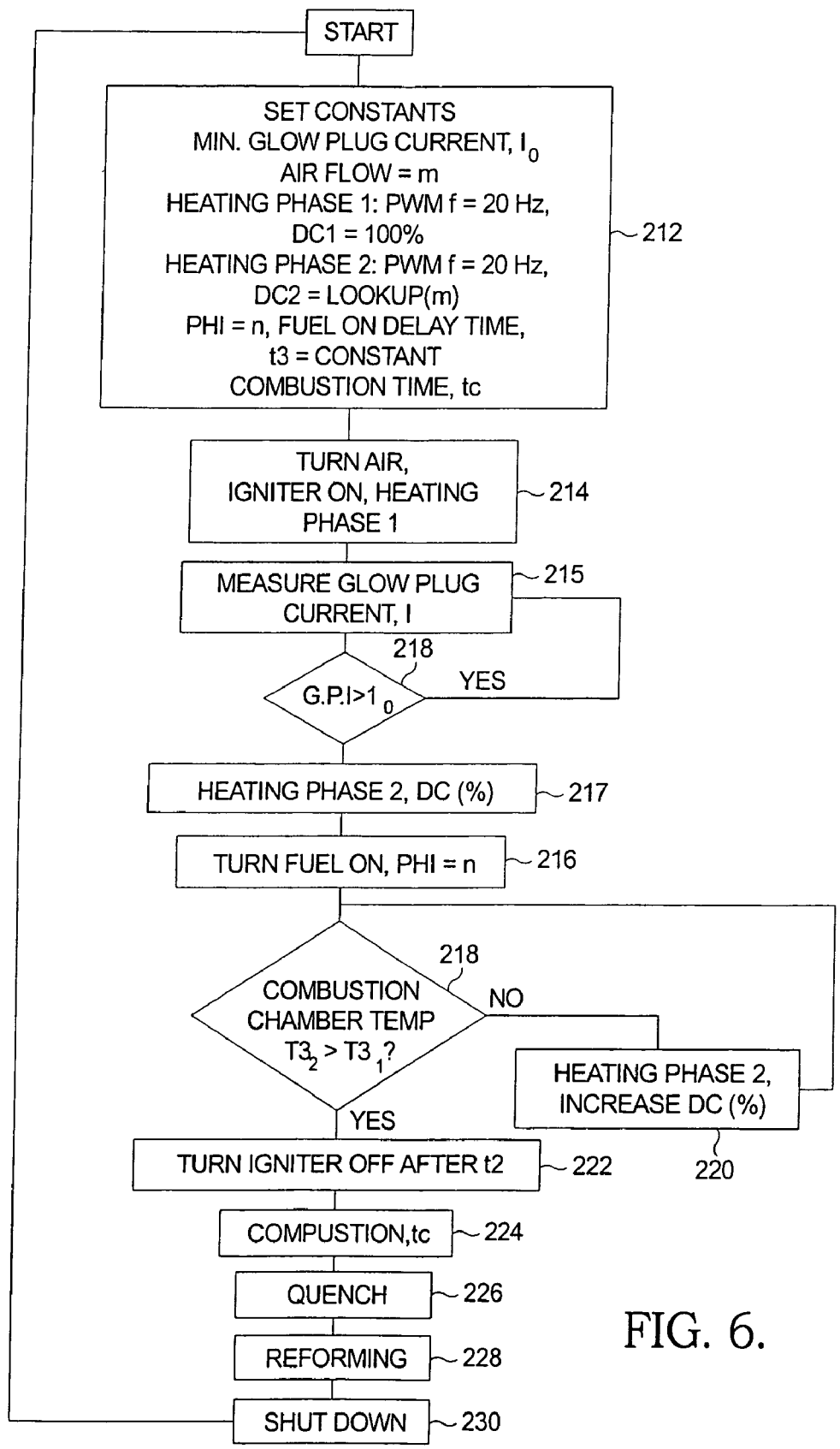
FIG. 6 is a second algorithm in accordance with the invention for controlling glow plug ignition of a fuel/air mixture at startup of a catalytic hydrocarbon reformer.

Referring now to FIG. 6, a second algorithm 200 for controlling temperature and heating time/intensity of a glow plug during start-up of a catalytic reformer, alternative to first algorithm 100, is based upon the passage of electric current through the glow plug which, of course, is a function of the resistance as described above.

The system constants are set 212: a minimum glow plug current $I_0$ set for controlling the heating phase 1; mass air flow m into the reformer; First Heating Phase PWM duty cycle 1=100%; Second Heating Phase PWM duty cycle 2 calculated from a look-up table including the data shown in FIG. 3 and conducted for time t2; fuel/air mixture phi=n; fuel delay time t3 is set to allow for heating the glow plug to $T_C$ before fuel introduction; and a combustion time tc is set for mixture combustion in the reformer mixing chamber.

The air and glow plug are turned on 214, beginning Heating Phase 1 at duty cycle 1.

The glow plug current is measured 215 and checked 218 against current $I_0$ to ensure that the glow plug reaches targeted surface temperature.

After passage of times t1 and t3, fuel to the reformer is started 216 at a specified phi value, beginning Heating Phase 2 217 (start of time t2) at duty cycle 2.

Successful combustion start is checked by checking for temperature rise 218 in the combustion chamber and increasing 220 duty cycle 2 if combustion has not started.

The remaining steps are analogous to those described above for algorithm 100 and are analogously numbered.

With this method, there is no need to know the resistance of the glow plug and the off-state of the glow plug. The length of time to power the glow plug is determined through the current flow through the glow plug at the time of powering.

Figure 7:
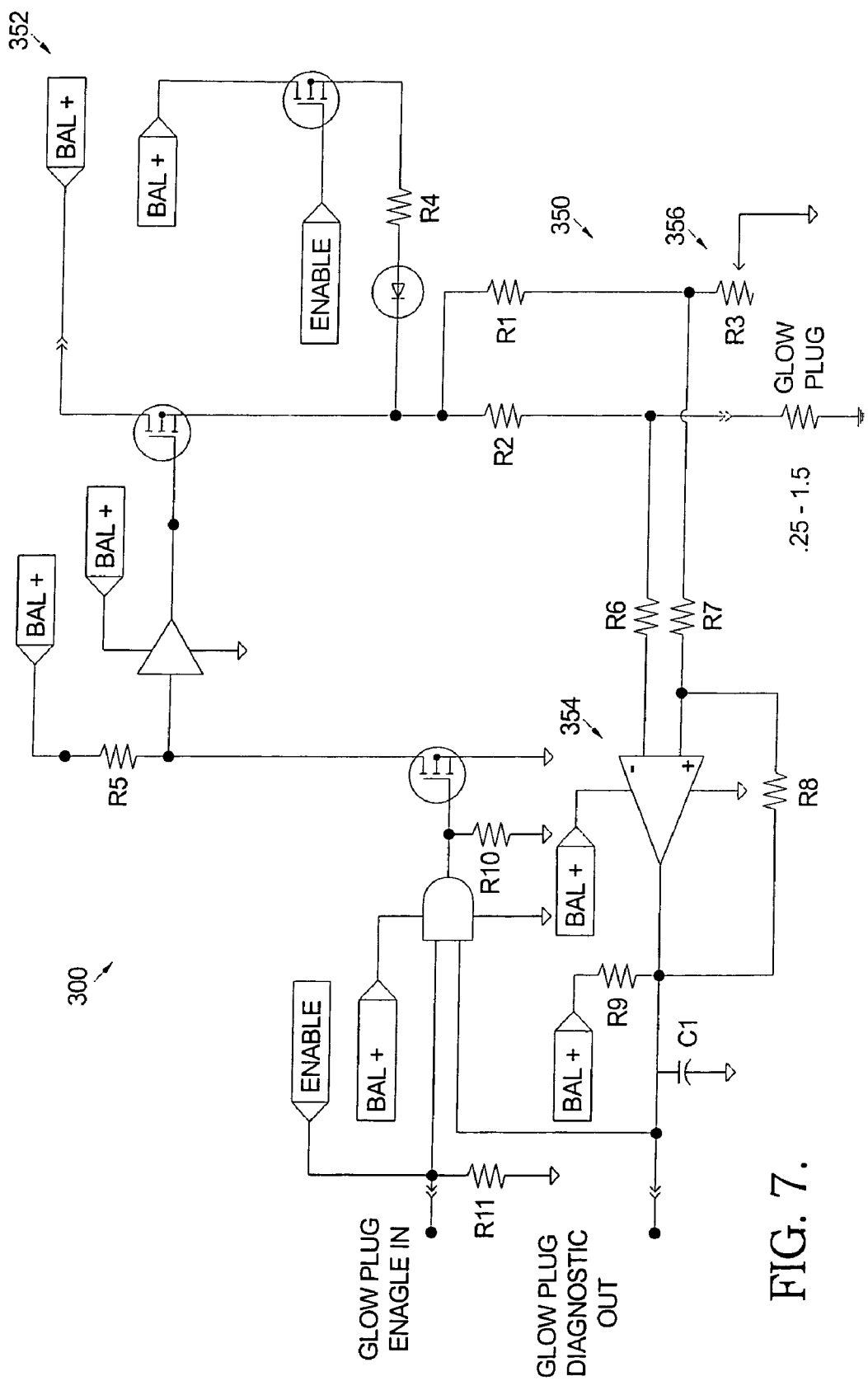
FIG. 7 is a circuit diagram for automatic temperature control of a glow plug during both Heating Phases 1 and 2.

Referring now to FIG. 7, an automated glow plug control circuit 300 may be used to achieve automatically the desired glow plug control in Heating Phases 1 and 2. Circuit 300 has the advantages of self-regulating of the glow plug control to the desired glow plug temperature. No PWM driver channel is required to control glow plug power on/off. Circuit 300 comprises a Wheatstone bridge 350 with a high side drive circuit 352 and a comparator circuit 354 with an AND gate to enable the drive and chop the current to the glow plug. By selecting the proper resistor value 356 based upon the glow plug ignition temperature requirement, the glow plug is turned on when the glow plug resistance is below the value determined by the preset threshold on 356. Recall that glow plug resistance increases with temperature (FIG. 1). When the resistance of the glow plug reaches the preset value at $T_C$, the glow plug is turned off automatically. This process repeats itself based upon the value of the glow plug resistance, thereby enabling the glow plug to be heated quickly to the desired surface temperature $T_C$ and then maintained at this temperature.

Note that Circuit 300 is usefully applicable to control of any glow plug used as a heating source in any application, not being restricted to an ignition device in a catalytic hydrocarbon reformer.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for controlling resistance heating of a glow plug, comprising the steps of:

a) constantly passing electric current at a predetermined voltage through said glow plug for a predetermined time period to cause the surface of said glow plug to be raised to a predetermined target temperature;
b) stopping said constantly passing step when said predetermined target temperature is reached; and
c) intermittently passing electric current through said glow plug to cause said surface to be maintained at said predetermined target temperature for a predetermined length of time, wherein said glow plug is an igniter in a hydrocarbon catalytic reformer.

2. A method in accordance with claim 1 wherein said glow plug is a rapid-start glow plug.

3. A method in accordance with claim 1 wherein said hydrocarbon catalytic reformer is a component in a diesel exhaust aftertreatment system.

4. A method for controlling resistance heating of a glow plug, comprising the steps of:
a) constantly passing electric current at a predetermined voltage through said glow plug for a predetermined time period to cause the surface of said glow plug to be raised to a predetermined target temperature;
b) stopping said constantly passing step when said predetermined target temperature is reached; and
c) intermittently passing electric current through said glow plug to cause said surface to be maintained at said predetermined target temperature for a predetermined length of time, wherein steps a through c are accomplished by an electrical circuit containing a Wheatstone bridge.

5. A method in accordance with claim 1 wherein steps a through c are accomplished by an algorithm based upon measurement of glow plug resistance.

6. A method in accordance with claim 1 wherein steps a through c are accomplished by an algorithm based upon measurement of current passage through said glow plug.

* * * * *